United States Patent [19]

Sauer

[11] Patent Number: 4,616,858
[45] Date of Patent: Oct. 14, 1986

[54] FLEXIBLE PIPE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 664,346

[22] Filed: Oct. 24, 1984

[30] Foreign Application Priority Data

Oct. 28, 1983 [DE] Fed. Rep. of Germany ....... 3339169

[51] Int. Cl.$^4$ .............................................. F16L 21/00
[52] U.S. Cl. .................... 285/235; 285/373; 285/243; 285/253; 285/419; 403/313; 403/344
[58] Field of Search .............. 285/235, 373, 243, 253, 285/419; 403/313, 344; 24/20 EE, 20 LS, 23 EE

[56] References Cited

U.S. PATENT DOCUMENTS

| 3,142,881 | 8/1964 | Johnston | 285/253 |
| 3,183,938 | 5/1965 | Smith et al. | 285/419 |
| 3,376,055 | 4/1968 | Ponroe | |
| 3,527,484 | 9/1970 | Walkden | 285/236 |
| 3,801,141 | 4/1974 | Hollingsworth | |

FOREIGN PATENT DOCUMENTS

| 1078200 | 3/1960 | Fed. Rep. of Germany |
| 1806616 | 5/1970 | Fed. Rep. of Germany |
| 1944342 | 3/1971 | Fed. Rep. of Germany |
| 1923950 | 11/1972 | Fed. Rep. of Germany |
| 7316306 | 8/1973 | Fed. Rep. of Germany |
| 80339737 | 5/1981 | Fed. Rep. of Germany |
| 2428101 | 10/1983 | Fed. Rep. of Germany |
| 2321315 | 1/1986 | Fed. Rep. of Germany |
| 567222 | 9/1975 | Switzerland |
| 2103272 | 7/1981 | United Kingdom |

Primary Examiner—Cornelius J. Husar
Assistant Examiner—Douglas W. Hanson
Attorney, Agent, or Firm—Peter K. Kontler

[57] ABSTRACT

A flexible pipe coupling for the end portions of two pipes has an elastic sleeve whose open ends receive the end portions of the pipes and which has a centrally located partition extending from its internal surface and abutting against the end faces of the inserted pipes. The partition is flanked by two internal grooves which are formed in the internal surface and are flanked by annular surfaces sloping inwardly toward the partition. The external surface of the sleeve has a centrally located outer groove and is surrounded by a split ring forming part of a clamp and having apertured lugs extending outwardly from the two end portions of the ring to be moved nearer to each other by a bolt and nut assembly whose shank extends through the apertures so that the sleeve is compressed and its internal surface sealingly engages the external surfaces of the pipes. The split ring has a corrugation which extends into the outer groove of the sleeve. A second corrugation is provided on an arcuate insert which is placed between the split ring, in the region of its end portions, and the external surface of the sleeve, and such second corrugation also extends into the outer groove of the sleeve. The marginal portions of the split ring have a frustoconical shape and bear against the external surfaces of the respective pipes when the ring is caused to bear against the external surface of the sleeve.

20 Claims, 6 Drawing Figures

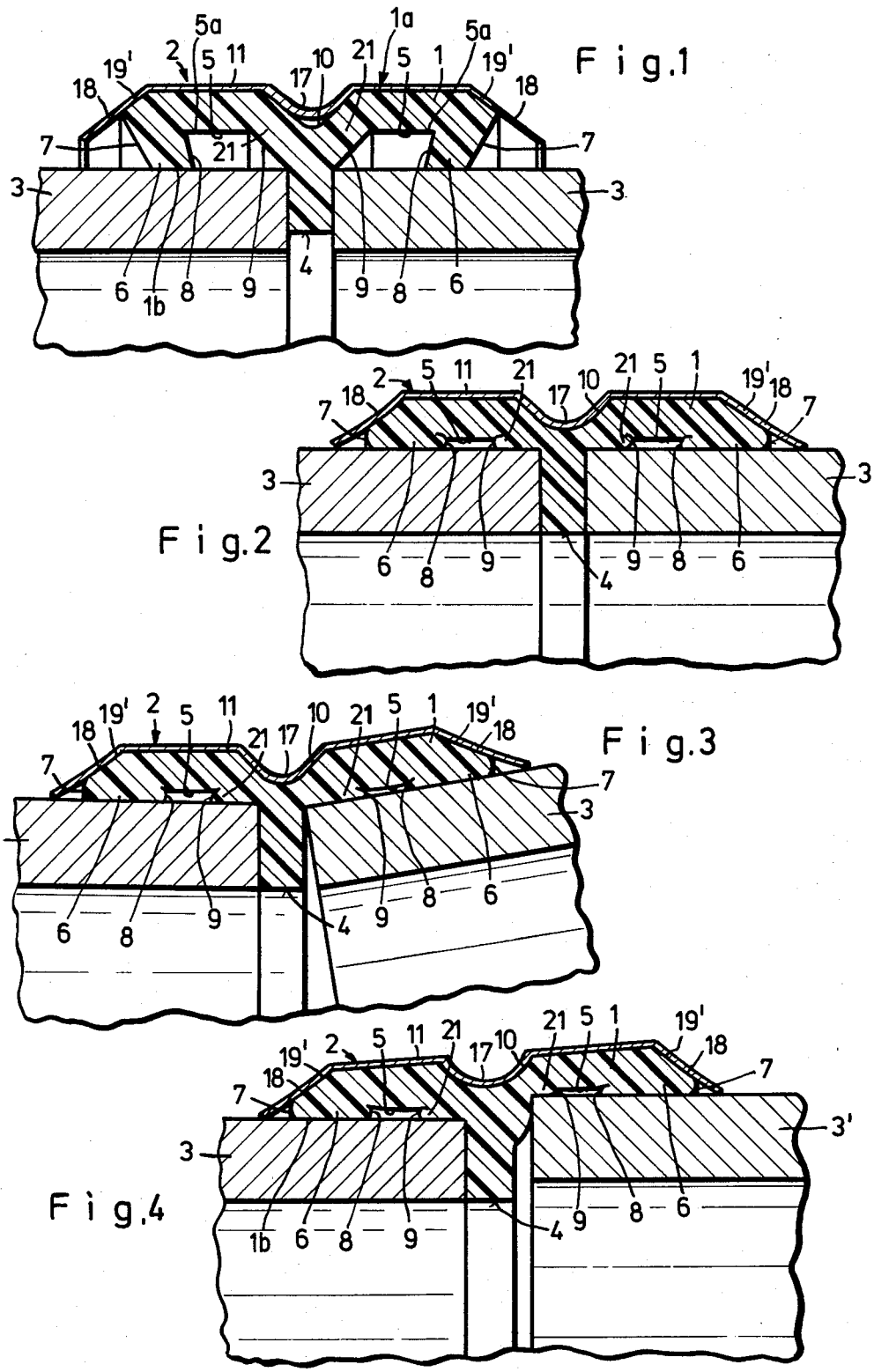

FLEXIBLE PIPE COUPLING

BACKGROUND OF THE INVENTION

The present invention relates to pipe couplings in general, and more particularly to improvements in flexible pipe couplings which employ sleeves of elastomeric material. Still more particularly, the invention relates to improvements in pipe couplings of the type wherein the sleeve is surrounded by the split ring of a clamp and the diameter of the split ring can be reduced to thereby urge the internal surface of the sleeve into sealing engagement with the external surfaces of the pipes.

It is already known to provide the sleeve of the above outlined pipe coupling with an internal partition in the form of a collar extending from the internal surface of the sleeve and abutting against the end faces of the pipes whose end portions are inserted into the respective open ends of the sleeve. Reference may be had to Swiss Pat. No. 432,956. It is also known to provide such a sleeve with internal grooves which flank the partition and whose volume is reduced in response to radial compression of the sleeve under the action of the split ring. It is further known to provide the split ring with a circumferentially extending corrugation which is received in the circumferentially extending groove in the external surface of the sleeve. Reference may be had to German Utility Model No. 73 16 306 which further discloses that the marginal portions (i.e., the axial end portions) of the split ring can be bent inwardly into planes which are normal to the axis of the sleeve. The gap between the lugs which are provided at the ends of the split ring and through which the bolts and nuts of the tensioning device of the clamp extend exposes a portion of the material of the elastic sleeve. This is undesirable because, when the lugs are caused to move nearer to each other, some material of the sleeve bulges outwardly and penetrates into the gap so that the latter cannot be completely closed, i.e., the sleeve imposes limits upon the extent of its radial compression by the clamp. In many instances, the extent of penetration of the material of the sleeve into the gap is so pronounced that the maximum achievable radial compression of the sleeve does not suffice to ensure the establishment of a reliable sealing action between the internal surface of the sleeve and the external surfaces of the inserted end portions of the pipes. Moreover, the sleeve is likely to be damaged because some of its material is pinched between the lugs of the split ring. Still further, the sealing action between the sleeve and the pipes in the region between the lugs of the split ring is much less pronounced than in the other regions so that the fluid medium which is confined in the pipes is likely to escape if its pressure exceeds the pressure in the surrounding area.

OBJECTS AND SUMMARY OF THE INVENTION

An object of the invention is to provide a novel and improved flexible pipe coupling whose sealing action is much more uniform than that of the aforedescribed conventional couplings and which is constructed and assembled in such a way that the sealing action in the region between the lugs of the split ring cannot be affected by the material of the sleeve.

Another object of the invention is to provide a novel and improved elastic sleeve for use in the above outlined pipe coupling.

A further object of the invention is to provide a novel and improved clamp for use in the pipe coupling of the above outlined character.

An additional object of the invention is to provide novel and improved means for preventing penetration of the material of the elastic sleeve into the gap between the lugs at the end portions of the split ring which forms part of the clamp for the sleeve.

Still another object of the invention is to provide a pipe coupling which can be assembled, adjusted or removed within a fraction of the time that is needed for such operations in connection with conventional pipe couplings.

A further object of the invention is to provide a pipe coupling which can be used for the establishment of a reliable sealing action between pipes having identical outer diameters or between pipes having different (and even widely different) outer diameters.

Another object of the invention is to provide a novel and improved method of establishing a flexible seal between the end portions of two pipes having identical or different outer diameters.

An additional object of the invention is to provide a pipe coupling which can be readily adjusted to select its sealing action within a desired range and wherein the lugs of the split ring can stand pronounced bending stresses even though their material and/or manner of mounting need not deviate from that in conventional pipe couplings.

The invention resides in the provision of a coupling for the establishment of a fluidtight connection between the neighboring end portions of two pipes, e.g., between the end portions of two metallic pipes having identical or different outer diameters. The coupling comprises a deformable elastic sleeve having two open ends, an external surface, an internal surface, a substantially centrally located annular partition extending inwardly from the internal surface and disposed between the end portions of the pipes which are inserted into the sleeve through the respective open ends, two inner circumferential grooves provided in the internal surface at the opposite sides of the partition, and a third circumferential groove provided in the external surface outwardly of the partition. The coupling further comprises a clamp including a relatively wide band-like split ring which surrounds the external surface of the sleeve and has a first corrugation whose convex side extends into the third groove. The ring further comprises two end portions (as considered in the circumferential direction of the sleeve) which are provided with outwardly extending lugs or otherwise configurated projections, and the clamp further comprises tightening means for drawing the projections together to thereby tighten the ring around the external surface of and deform the sleeve into pronounced sealing engagement with the external surfaces of the end portions of the pipes. The ring has frustoconical axial end portions or marginal portions which overlie the open ends of the sleeve and taper inwardly in directions away from the partition. The improved coupling further comprises an arcuate insert which is made of sheet metal or the like and is disposed between the ring and the external surface of the sleeve, at least in the region between the projections at the end portions of the ring. The insert has a second corrugation which receives the adjacent portion of the first corrugation and whose convex side extends into the third groove.

The sleeve preferably further comprises two annular ribs which terminate at the internal surface at the opposite sides of the partition. The inner grooves of the sleeve are disposed between the partition and the respective ribs. The sleeve has additional internal surfaces flanking those portions of the inner grooves which are remote from the partition, and such additional surfaces preferably slope inwardly in directions toward the partition.

The tightening means can comprise a single bolt and nut assembly. Each projection then preferably comprises a hole which is disposed substantially midway between the axial ends of the ring, and the shank of the bolt of the aforementioned assembly extends through such holes of the projections. The arrangement is preferably such that the shank portion between the two projections extends into the second corrugation, i.e., into the corrugation of the insert in the region between the two projections.

The dimensions of the frustoconical marginal portions of the ring are preferably selected in such a way that, when the sleeve is not deformed by the tightening means and the ring, the smallest diameters of the frustoconical marginal portions exceed the smallest diameters of the respective ribs but are less than the diameters of bottom surfaces in the respective inner grooves.

The insert can be welded or otherwise affixed to the ring of the clamp, at least in the region of one end portion of the ring.

The annular axially outer sides or surfaces of the aforementioned ribs preferably taper inwardly in directions toward the partition, and the same preferably holds true for those surfaces of the sleeve which are disposed in the inner grooves adjacent to the partition.

The frustoconical marginal portions of the ring are engaged and deformed by the external surfaces of the respective pipes when the tightening means is caused to reduce the diameter of the split ring and to thus move the internal surface of the sleeve into sealing engagement with the external surfaces of the pipes.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a flexible pipe coupling which embodies the invention, the end portions of the two pipes being shown in fully inserted positions and the clamp being shown in unstressed condition so that the elastic sleeve is undeformed;

FIG. 2 shows the structure of FIG. 1 but with the clamp in operative position in which the sleeve is subjected to radial deforming stresses;

FIG. 3 is a sectional view similar to that of FIG. 2 but showing the end portions of the pipes in positions in which their axes make an obtuse angle;

FIG. 4 is a sectional view similar to that of FIG. 2 but showing the end portions of two pipes having different diameters;

DESCRIPTION OF THE PREFERRED EMBODIMENTS

Figure 5:
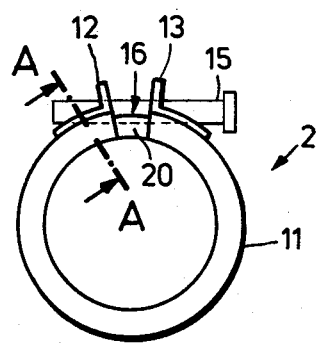
FIG. 5 is a smaller-scale end elevational view of the clamp and of the insert.
Figure 6:
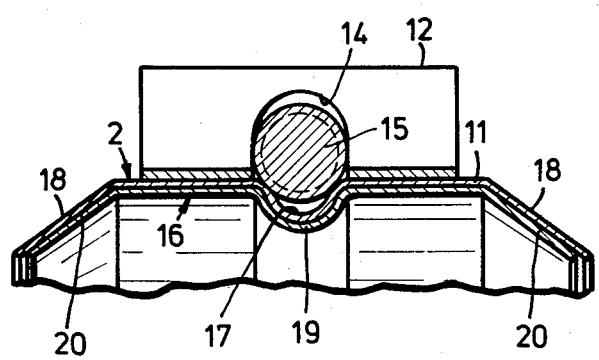
FIG. 6 is an enlarged sectional view as seen in the direction of arrows from the line A—A of FIG. 5.

Referring to FIG. 1, there is shown a flexible pipe coupling which is used to fluidtightly connect the end portions 3 of two metallic pipes having identical outer diameters. The coupling comprises a sleeve 1 which is made of rubber (such as ethylenepropylene-terpolymer) or other suitable elastomeric material, a clamp 2 including a relatively wide split ring 11 and a bolt and nut assembly including a bolt 15 which is shown in FIGS. 5 and 6, and an insert 16 which is disposed between a portion of the external surface 1a of the sleeve 1 and a portion of the internal surface of the split ring 11. The end portions 3 of the two pipes are inserted into the respective open ends of the sleeve 1 so that their end faces abut against an annular partition 4 which extends inwardly from the internal surface 1b of the sleeve 1 substantially midway between the axial ends of the latter. The partition 4 prevents the penetration of a fluid from the interior of the pipes into the space between the internal surface 1b and the external surfaces of the end portions 3. The inner diameter of the partition 4 is invariably smaller than the outer diameters of the end portions 3 of the two pipes.

The internal surface 1b of the sleeve 1 is formed with two circumferentially complete inner grooves 5 which are disposed at the opposite sides of the partition 4 so that their open sides face the external surfaces of the respective end portions 3. The grooves 5 are flanked by ribs 6 which terminate at the internal surface 1b and have outer sides or surfaces 7 which taper inwardly in directions toward the partition 4, i.e., toward the central symmetry plane of the sleeve 1. Those (additional) surfaces 8 of the sleeve 11 which flank the grooves 5 in regions that are remotest from the central symmetry plane of the sleeve 1 also taper inwardly toward the partition 4, and the same holds true for the (additional) surfaces 9 flanking those sides of the grooves 5 which are nearest to the partition. The taper of the surfaces 7, 8, 9 is gradual (i.e., linear) all the way to the internal surface 1b. It can be said that the ribs 6 are undercut at those sides which are flanked by the tapering surfaces 8. The bottom surfaces in the grooves 5 are denoted by the reference characters 5a. The surfaces 7, 8 and 9 need not taper linearly, i.e., such surfaces can also assume a slightly or even pronouncedly concave or convex shape.

The external surface 1a of the sleeve 1 has an at least substantially centrally located third or outer circumferential groove 10 which has a substantially V-shaped cross-sectional outline but can also be U-shaped or it can be bounded by a truly semicylindrical surface.

The clamp 2 comprises the aforementioned split ring 11 which surrounds the major part of the external surface 1a of the sleeve 1 except in the region between its end portions (as considered in the circumferential direction of the split ring) which carry outwardly extending projections in the form of lugs 12 and 13. The gap between the lugs 12 and 13 disappears, at least substantially, when the diameter of the ring 11 is reduced by a tightening device including the bolt and nut assembly of which only the bolt 15 is shown in FIGS. 5 and 6. The split ring 11 resembles the letter C with a relatively narrow gap between the lugs 12, 13 even when the ring 11 does not subject the sleeve 1 to radially acting compressive stresses. The material of the ring 11 is preferably sheet steel and the lugs 12, 13 may constitute integral portions of or they may be welded to the ring 11. In the embodiment which is shown in the drawing, the lugs 12 and 13 are L-shaped members whose longer legs are welded to the respective end portions of the C-shaped body of the ring 11 and whose shorter legs extend substantially radially outwardly and have aligned apertures or holes 14 each of which is located substantially midway between the axial ends of the ring 11. The bolt and nut assembly including the bolt 15 draws the lugs 12, 13 together, or at least closer to each other, when the diameter of the external surface 1a of the sleeve 1 is to be reduced so that the internal surface 1b is sealingly pressed against the external surfaces of the end portions 3 of the two pipes. The head of the bolt 15 is preferably provided with a hexagonal socket, not shown in the drawing, for reception of a suitable tool serving to facilitate rotation of the bolt 15 while the nut (not shown) is held against rotation and/or vice versa.

The central portion of the ring 11 constitutes a circumferentially extending corrugation 17 which extends in part directly into the groove 10 of the external surface 1a and in part into the corrugation 19 of the insert 16 (to the extent that the insert 16 is overlapped by the two end portions of the ring 11). The ring 11 further comprises frustoconical axial end portions or marginal portions 18 which taper inwardly in directions away from the partition 4 of the sleeve 1 and overlie similar axial end portions or marginal portions 20 of the insert 16. The external surface 1a of the sleeve 1 has frustoconical marginal portions 19' which are in contact with the inner sides of the frustoconical marginal portions 18 of the ring 11 except in the region where such marginal portions 19' are in contact with the inner sides of the marginal portions 20 of the insert 16. The curvature of the corrugation 19 of the insert 16 preferably matches that of the adjacent portion of the corrugation 17, and the convex side of the corrugation 19 is in direct contact with the surface bounding the adjacent portion of the groove 10 in the external surface 1a of the sleeve 1.

The improved flexible pipe coupling is manipulated in the following way:

The end portions 3 of the two pipes are inserted through the respective open ends of the sleeve 1 until their end faces come into abutment with the respective sides of the partition 4. The split ring 11 surrounds the sleeve 1 and the insert 16 is located between the end portions of the ring 11 and the adjacent portion of the external surface 1a so that a portion of the insert 16 extends across the gap between the lugs 12 and 13. The shank of the bolt 15 is then inserted into the holes 14 and the bolt and nut assembly is manipulated in order to reduce the distance between the lugs 12 and 13, i.e., to reduce the diameter of the external surface 1a of the sleeve 1 so that the internal surface 1b is moved into reliable sealing engagement with the external surfaces of the end portions 3. Such reduction of the diameter of the external surface 1a entails a more or less pronounced deformation of the surfaces 7, 8, 9 in a manner as shown in FIG. 2. The material of those portions (21) of the sleeve 1 which are outwardly adjacent to and are disposed at the opposite sides of the partition 4 undergoes a radial densifying action and expands in the axial direction of the sleeve 1, and the same holds true for the material of the ribs 6. The area of contact between the internal surface 1b of the sleeve 1 and the external surfaces of the end portions 3 of the pipes increases as the diameter of the external surface 1a decreases, i.e., in response to movement of the lugs 12 and 13 nearer to each other. Furthermore, the resistance which the improved coupling offers to changes in mutual inclination of the two pipes also increases with progressing reduction of the diameter of the ring 11 and external surface 1a. FIG. 3 shows the end portions 3 of the two pipes in mutually inclined positions. The extent of mutual inclination is exaggerated for the sake of clarity. The sealing action does not terminate or need not terminate in response to such changes in the positions of the two pipes relative to each other. The pipes are held against movement out of axial alignment with one another because the external surfaces of the two end portions 3 are engaged by the innermost portions of the two frustoconical marginal portions 18 of the ring 11 (note FIGS. 2 and 3). Moreover, the material (e.g., spring steel) of the ring 11 preferably exhibits at least some resiliency so that the ring 11 tends to return the pipes to positions of axial alignment with one another as soon and as long as the one or the other pipe is moved away from such axial alignment. An additional desirable feature of the frustoconical marginal portions 18 of the ring 11 is that they prevent (or reduce the likelihood of) deformation of the material of the sleeve 1 beyond its elastic limit so that the improved coupling remains intact for longer periods of time. Still further, and since the innermost parts of the frustoconical marginal portions 18 of the ring 11 bear against the external surfaces of the respective end portions 3, they also oppose undesirable or unintentional axial shifting of the two pipes away from each other, i.e., they oppose a partial or complete extraction of the end portions 3 from the respective open ends of the sleeve 1.

The provision of corrugations 17 and 19 exhibits the advantage that the coupling can be flexed in the region of the partition 4 in response to movement of the one and/or other pipe out of the position of axial alignment which is shown in FIG. 2, e.g., to the position of FIG. 3. The more or less pronounced flexibility of the coupling in the region of the corrugations 17 and 19 ensures that each and every part of the internal surface 1b of the sleeve 1 is more likely to remain in actual sealing contact with the external surface of the respective end portion 3 when the pipes are caused to assume the positions which are shown in FIG. 3. In addition, the corrugations 17 and 19 hold the ring 11 against axial movement relative to the sleeve 1 and/or vice versa because each of these corrugations extends into the groove 10 in the external surface 1a. Still further, the corrugations 17 and 19 perform a desirable centering action for the sleeve 1 as well as for the ring 11. The groove 10 is preferably located at least substantially midway between the axial ends of the sleeve 1 and ring 11. Last but not least, the corrugations 17 and 19 urge the material of the sleeve 1 radially inwardly toward the partition 4 so that the latter is held in desirable pronounced sealing engagement with the end faces of the end portions 3.

FIG. 4 shows that the improved flexible coupling can be used with equal or similar advantage when the outer diameter of the end portion 3' of one of the pipes exceeds the nominal outer diameter of the end portion 3 of the other pipe. Tightening of the ring 11 around the sleeve 1 then entails a non-symmetrical deformation of the sleeve 1 and its ribs 6. However, the sealing action is still very satisfactory, i.e., the internal surface 1b is in adequate sealing engagement (a) with the external surface of the end portion 3 whose outer diameter is assumed to match or closely approximate the nominal diameter for which the coupling is designed and (b) with the larger-diameter external surface of the end portion 3'. The sealing action in the regions of those portions (21) of the sleeve 1 which are outwardly adjacent to and are disposed at the opposite sides of the partition 4 is also very satisfactory even if the entire right-hand side of the partition 4 is not in actual contact with the end face of the end portion 3'. The sealing action in the region of the right-hand portion 21 of the sleeve 1 of FIG. 4 suffices to prevent leakage of confined fluid medium along the external surface of the end portion 3'. The surfaces 9 in the inner grooves 5 are in actual contact or close to actual contact with the external surfaces of the respective end portions 3 and 3'.

The provision of surfaces 7 which taper inwardly toward the partition 4 is desirable and advantageous on the additional ground that they facilitate the introduction of end portions 3, 3 or 3 and 3' into the respective open ends of the sleeve 1. In other words, the surfaces 7 actually guide the end portions of the pipes in directions toward the respective sides of the partition 4 when the sleeve 1 is in the process of being slipped onto two end portions 3 or onto the end portions 3 and 3'.

The surfaces 8 bounding those portions of the inner grooves 5 that are remotest from the partition 4 and tapering inwardly toward the partition enable the ribs 6 to offer a progressively increasing resistance to extraction of the end portions 3, 3 of FIG. 2 or the extraction of the end portions 3, 3' of FIG. 4 from the respective open ends of the sleeve 1 before the tightening action of the bolt and nut assembly including the bolt 15 is relaxed or terminated. The ribs 6 then tend to move into planes which extend substantially radially of the end portions of the pipes and thereby increase the force with which their innermost portions bear against the pipes. The provision of surfaces 7 which taper inwardly toward the partition 4 also contributes to the ability of the ribs 6 to resist extraction of the end portions of the pipes from the respective open ends of the sleeve 1 before the tensioning action of the bolt and nut assembly is relaxed or terminated. Any attempt to extract the end portions 3, 3 of FIG. 2 or the end portions 3, 3' of FIG. 4 from the sleeve 1 will result in the tendency of the ribs 6 to move radially inwardly, i.e., the frictional engagement between the ribs and the end portions of the pipes then becomes even more pronounced which results in the generation of substantial forces that oppose the extraction of pipes from the sleeve.

The provision of corrugation 19 in the insert 16, and more particularly in that portion of the insert which is disposed in the gap between the lugs 12, 13 of the ring 11 prior to tightening of the bolt and nut assembly, exhibits the advantage that the holes 14 can be placed nearer to the axis of the sleeve 1, i.e., that the portion of the shank of the bolt 15 between the end portions 12 and 13 can actually extend into the corrugation 19 (there is no corrugation 17 in the gap between the lugs 12 and 13). This enables the bolt and nut assembly to exert a greater force without deforming the radially outwardly extending legs of the lugs 12 and 13. Otherwise stated, the action of the bolt 15 is felt in a region which is nearer to the external surfaces of the pipes and extends tangentially of the ring 11. It will be readily appreciated that such mounting of the bolt 15 reduces the likelihood of premature bending of the radially outwardly extending legs of the lugs 12, 13 in response to the application of a force which tends to move such legs nearer to one another.

If the outer diameters of the pipes are large or very large and, therefore, the initial width of the gap between the lugs 12 and 13 is rather pronounced, the bolt 15 is likely to become bent during tensioning, i.e., during movement of the lugs 12 and 13 nearer to each other, with the result that the shank of the bolt comes into actual contact with the concave surfaces of those portions of the corrugation 17 which are adjacent to the radially extending legs of the lugs 12 and 13. It has been found that such bending of the shank does not adversely affect the sealing action because the shank is sufficiently close to the external surfaces of the pipes to extend into the corrugation 19 (between the lugs 12 and 13) and/or into the corrugation 17 adjacent to both sides of the gap between the lugs 12 and 13. It will be seen that the lugs 12 and 13 can be subjected to the action of pronounced or very pronounced forces without premature bending of their radially outwardly extending legs, and this is attributable to the placing of the holes 14 close or very close to the C-shaped body of the ring 11 so that the shank of the bolt 15 can extend into the adjacent portions of the corrugation 17 and/or 19. The provision of corrugation 19 in the insert 16 enhances the versatility of the improved flexible coupling because the latter can be used to establish reliable seals between pairs of pipes having larger or smaller outer diameters as well as between two pipes having different outer diameters.

In order to ensure that the shank of the bolt 15 will be located even closer to the axis of the ring 11 and sleeve 1, it is desirable to select the radii of curvature of the corrugations 17 and 19 in such a way that the shank of the bolt 15 penetrates fully or nearly fully into the adjacent portion of the corrugation 19, i.e., the radii of curvature of the corrugations 17 and 19 can be even larger than shown in FIG. 6. In fact, the radii of curvature of the corrugations can be increased to such an extent that a portion of the head of the bolt 15 can penetrate into the adjacent portion of the corrugation 17. The width of the holes 14 in the radially outwardly extending legs of the lugs 12 and 13 is then increased accordingly, i.e., the width of such holes exceeds the width of the hole which is shown in FIG. 6 so that it is greater than the diameter of the shank of the bolt 15.

The insert 16 is welded or otherwise secured to the inner side of the ring 11 at one side of the gap between the lugs 12 and 13, i.e., to one end portion of the C-shaped body of the ring 11. However, it is equally within the purview of the invention to make the insert 16 integral with one end portion of the C-shaped body and to make such one end portion narrower so that it can be fitted between the marginal portions 18 in the region of the other end portion.

The marginal portions 18 of the ring 11 can constitute originally cylindrical marginal portions, and such marginal portions are then formed with V-shaped notches to allow for bending of arcuate portions between the notches inwardly and to impart to the resulting composite axial end portions a substantially frustoconical shape. Moreover, the marginal portions 18 can be formed with teeth, studs or otherwise configurated protuberances which engage the external surfaces of the adjacent end portions of the pipes to even further reduce the likelihood of axial movement of pipes in directions axially of and away from one another. Such protuberances act not unlike thorns which tend to penetrate into the external surfaces of the respective end portions of the pipes, especially if such end portions are pulled in directions to effect their extraction from the respective open ends of the sleeve.

The marginal portions 18 of the split ring 11 are or can be deformable by the pipes so that they move into strong frictional engagement with the external surfaces of the respective pipes when the diameter of the ring is reduced by the bolt and nut assembly. This increases the area of contact between the marginal portions 18 and the end portions of the respective pipes and contributes still further to the ability of the marginal portions 18 to oppose unwanted extraction of pipes from the sleeve 1. Moreover, deformability of the marginal portions 18 ensures that they can more accurately conform to the external surfaces of the pipes even if the outer diameters of the end portions of the pipes are different or deviate from the anticipated standard values. The ability of the marginal portions 18 of the ring 11 to conform to the external surfaces of the respective pipes is enhanced by the provision of the corrugation 17, i.e., by the ability of the ring 11 to flex intermediate its marginal portions 18. It has been found that, by properly dimensioning the ring 11, the lugs 12 and 13 can be drawn into actual and full surface-to-surface contact with one another even if the outer diameter of one of the pipes exceeds the outer diameter of the other pipe.

If desired, the marginal portions 18 of the ring 11 can be designed in such a way that their radially innermost portions remain in mere linear contact with the external surfaces of the respective pipes. This also enhances the ability of the marginal portions 18 to resist extraction of the pipes from the open ends of the sleeve 1 because the radially innermost portions of the marginal portions 18 actually bite into the material of the pipes, especially if the material of the pipes is relatively soft.

The marginal portions 18 also ensure that the insert 16 remains in an optimum position (so that its corrugation 19 receives the adjacent portion of the corrugation 17) even if the outer diameter of one of the pipes exceeds the outer diameter of the other pipe. This, in turn, ensures that the lugs 12 and 13 are moved toward each other in an optimum way (without lateral straying) when the bolt and nut assembly is applied to reduce the outer diameter of the C-shaped body of the ring 11.

While it is possible to provide the sleeve 1 with more than a single pair of internal ribs 6, the provision of only one rib at each side of the partition 4 has been found to suffice in most instances. This is desirable and advantageous because the number of ribs determines the axial length and hence the cost (material requirements) of the sleeve. The provision of an undercut (surface 8) at that side of each rib 6 which is adjacent to the respective inner groove 5 brings about the advantage that the ribs 6 collapse in response to a reduction of the diameter of the ring 11 and move into pronounced surface-to-surface contact with the end portions of the respective pipes. This evidently enhances the ability of the ribs 6 to furnish a highly satisfactory sealing action as well as to resist undesired extraction of the pipes from the sleeve. As mentioned above, any pull upon the pipes 3, 3 or 3, 3' tends to change the configuration of the deformed (flattened) ribs 6 in a sense to move the ribs into planes extending radially of the end portions of the respective pipes with the result that the innermost portions of the ribs tend to move radially inwardly and their frictional engagement with the pipes becomes even more pronounced. This enhances the sealing action between the innermost portions of the ribs and the external surfaces of the pipes.

Heretofore known pipe couplings often employ several bolt and nut assemblies, normally at least one for each pipe. This exhibits several drawbacks. First of all, the cost of the clamp is higher and, secondly, it takes longer to assemble or dismantle the coupling. Still further, the bolts of each of a plurality of bolt and nut assemblies are likely to undergo different deformation if the outer diameter of one of the pipes does not match the outer diameter of the other pipe. Also, the bolts are likely to be deformed in response to changes in the inclination of one of the pipes in a plane which is parallel to the common plane of the axes of two or more bolts.

It is presently preferred to provide each of the lugs 12, 13 in the improved pipe coupling with a single hole or aperture 14 and to use a single bolt and nut assembly. As mentioned above, the holes 14 are preferably disposed midway between the axial ends of the ring 11, i.e., in register with the outer groove 10 of the sleeve 1. The placing of a single bolt and nut assembly midway between the axial ends of the ring 11 enhances the flexibility of the ring in the region of the corrugation 17. Moreover, the bolt of a single bolt and nut assembly is less likely to be bent in a plane that extends tangentially of the ring 11 when the outer diameter of one of the pipes deviates from the outer diameter of the other pipe and/or when one of the pipes is moved out of axial alignment with the other pipe. Furthermore, the clamp 2 can be applied or removed, or its compressing action altered, with little loss in time if the lugs 12 and 13 are held together by a single bolt and nut assembly.

The advantages of the feature that the holes 14 are placed as close as possible to the respective ends of the C-shaped body of the ring 11 were explained above. Thus, this renders it possible to apply to the lugs 12, 13 a larger force (which tends to move the lugs nearer to and into actual surface-to-surface contact with each other) without the danger of prematurely bending the radially outwardly extending legs of such lugs. Moreover, the shank of the bolt is less likely to be bent or otherwise deformed because it can actually abut against the surface bounding the concave outer side of the corrugation 19 between the lugs 12 and 13. The shank can also abut against the concave external surface of the corrugation 17 adjacent to the lugs 12 and 13. Such positioning of the holes 14 enables one and the same pipe coupling to establish reliable seals between pipes having smaller or larger (but identical) diameters as well as between pipes having different diameters. In other words, such positioning of the holes 14 enhances the versatility of the improved coupling.

In accordance with a presently preferred embodiment of the invention, the inner diameters of the marginal portions 18 of the ring 11 exceed the smallest diameters of the ribs 6 but are smaller than the diameters of bottom surfaces 5a in undeformed condition of the sleeve 1. This is shown in FIG. 1. Such dimensioning of the marginal portions 18, grooves 5 and ribs 6 has been found to ensure that the marginal portions 18 can prevent excessive deformation of the adjacent marginal portions of the sleeve 1 beyond the elastic limit of its material. At the same time, the engagement between the radially innermost parts of the marginal portions 18 and the external surfaces of the pipes (in deformed condition of the sleeve 1) is sufficiently pronounced to enable the portions 18 to effectively withstand undesired extraction of the pipes from the respective open ends of the sleeve while the latter is subjected to the radially acting compressive action of the ring 11 and insert 16.

The improved coupling can be used to establish a fluidtight connection between metallic pipes, between plastic pipes, and between combinations of metallic and plastic or other pipes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for the establishment of a fluidtight connection between the neighboring end portions of two pipes, comprising a deformable elastic sleeve having two open ends, an external surface, an internal surface, a substantially centrally located annular partition extending from said internal surface and disposed between the end portions of the pipes which are inserted into the sleeve through the respective open ends, two inner circumferential grooves provided in said internal surface at the opposite sides of said partition, and a third circumferential groove provided in said external surface; and a clamping unit including a split ring surrounding said external surface and having a first corrugation extending into said third groove, said ring further having two outwardly extending projections which are relatively movable between a first position in which said projections are separated by a first distance as considered circumferentially of said ring and a second position in which said projections are separated by a smaller second distance as considered circumferentially of said ring, and said clamping unit further having tightening means for drawing said projections from said first position to said second position to thereby tighten said ring around the external surface of and deform said sleeve, said clamping unit also including an arcuate insert which bridges at least the major part of the gap between said projections in said first position and is at least partially disposed between said ring and the external surface of said sleeve in said second position, and said insert having a second corrugation extending into said third groove and receiving the adjacent portion of the first corrugation in said second position.

2. The coupling of claim 1, wherein said sleeve further comprises two annular ribs terminating at said internal surface at the opposite sides of said partition, said inner grooves being disposed between said partition and the respective ribs.

3. The coupling of claim 1, wherein said sleeve has additional internal surfaces flanking those portions of said inner grooves which are remote from said partition, each of said additional surfaces sloping inwardly in a direction toward said partition.

4. The coupling of claim 1, wherein said tightening means comprises a single bolt and nut assembly.

5. The coupling of claim 4, wherein each of said projections has a hole disposed substantially midway between the axial ends of said ring and the bolt of said assembly has a shank extending through the holes of said projections.

6. The coupling of claim 1, wherein said tightening means comprises a bolt having a shank, a portion of which extends into said second corrugation intermediate said projections.

7. The coupling of claim 1, wherein said ring comprises two frustoconical marginal portions overlying the open ends of said sleeve and tapering inwardly in directions away from said partition.

8. The coupling of claim 7, wherein said sleeve further comprises two annular ribs terminating at said internal surface at the opposite sides of said partition, said inner grooves being disposed between said partition and the respective ribs, said sleeve having circumferentially extending bottom surfaces in said inner grooves and the minimum diameter of each of said frustoconical marginal portions in undeformed condition of said sleeve exceeding the smallest diameters of said ribs but being less than the diameters of said bottom surfaces.

9. The coupling of claim 1, wherein said insert is affixed to said ring in the region of one end portion of such ring.

10. The coupling of claim 1, wherein said sleeve comprises two annular ribs terminating at said internal surface at the opposite sides of said partition, said inner grooves being disposed between said partition and the respective ribs and each of said ribs having an annular outer side facing away from said partition and sloping inwardly in a direction toward said partition.

11. The coupling of claim 1, wherein said sleeve has additional internal surfaces provided in said inner grooves adjacent said partition and sloping inwardly in directions toward the partition.

12. The coupling of claim 1, wherein said sleeve has additional internal surfaces provided in said inner grooves and being remote from said partition, each of said additional surfaces sloping inwardly toward said partition.

13. The coupling of claim 1, wherein the marginal portions of said ring are arranged to engage with and to be deformed by the respective pipes in response to tightening of said ring around said sleeve.

14. The coupling of claim 7, wherein said insert comprises two frustoconical marginal portions which overlie the open ends of said sleeve and taper inwardly in directions away from said partition.

15. A coupling for the establishment of a fluidtight connection between the neighboring end portions of two pipes, comprising a deformable elastic sleeve having two open ends, an external surface, an internal surface, a substantially centrally located annular partition extending from said internal surface and disposed between the end portions of the pipes which are inserted into the sleeve through the respective open ends, two annular ribs at the opposite sides of said partititon terminating at said internal surface and each having an outer side facing away from and sloping inwardly in a direction towards said partition, two inner circumferential grooves provided in said internal surface at the opposite sides of said partition and each being disposed between said partition and a respective rib, and a third circumferential groove in said external surface; and a clamping unit including a split ring surrounding said external surface and having a first corrugation extending into said third groove, said ring being provided with two frustoconical marginal portions which overlie the open ends of said sleeve and taper inwardly in directions away from said partition, and said ring further having two outwardly extending projections which are relatively movable between a first position in which said projections are separated by a first distance as considered circumferentially and a second position in which said projections are separated by a smaller second distance as considered circumferentially of said ring, said clamping unit additionally including tightening means for drawing said projections from said first position to said second position to thereby tighten said ring around the external surface of and deform said sleeve, and said tightening means comprising a single bolt, said bolt extending through said projections and being disposed substantially midway said projections and being disposed substantially midway between the axial ends of said ring, and said clamping unit also including an arcuate insert which bridges at least the major part of the gap between said projections in said first position and is at least partially disposed between said ring and the external surface of said sleeve in said second position, said insert having a second corrugation extending into said third groove and receiving the adjacent portion of the first corrugation in said second position.

16. The coupling of claim 15, wherein said bolt projects into said second corrugation.

17. The coupling of claim 15, wherein said insert comprises two frustoconical marginal portions which overlie the open ends of said sleeve and taper inwardly in directions away from said partition.

18. The coupling of claim 17, wherein the frustoconical marginal portions of said insert essentially conform to the frustoconical marginal portions of said ring.

19. The coupling of claim 15, wherein said insert is of one piece with and constitutes an extension of said ring.

20. The coupling of claim 15, wherein said second corrugation constitutes an extension of said first corrugation.

* * * * *